(12) United States Patent
DeGrange, Jr. et al.

(10) Patent No.: US 6,885,825 B2
(45) Date of Patent: Apr. 26, 2005

(54) POWER BALANCED OPTICAL ADD/DROP MULTIPLEXER AND POWER BALANCING METHODS THEREFORE

(75) Inventors: James E. DeGrange, Jr., Glen Burnie, MD (US); Balakrishnan Sridhar, Ellicott City, MD (US)

(73) Assignee: CIENA Corporation, Linthicum, MD (US)

( * ) Notice: Subject to any disclaimer, the term of this patent is extended or adjusted under 35 U.S.C. 154(b) by 562 days.

(21) Appl. No.: 09/777,774

(22) Filed: Feb. 6, 2001

(65) Prior Publication Data

US 2002/0105694 A1 Aug. 8, 2002

(51) Int. Cl.[7] .............................................. H04J 14/02
(52) U.S. Cl. ........................................................ 398/83
(58) Field of Search .............................. 398/79, 97, 83, 398/9, 34, 37

(56) References Cited

U.S. PATENT DOCUMENTS

| | | | |
|---|---|---|---|
| 6,069,719 A | | 5/2000 | Mizrahi ........................ 359/124 |
| 6,122,096 A | * | 9/2000 | Fatehi ..................... 359/337.21 |
| 6,208,441 B1 | * | 3/2001 | Jones et al. ..................... 398/87 |
| 6,219,162 B1 | * | 4/2001 | Barnard et al. ................. 398/9 |
| 6,535,309 B1 | * | 3/2003 | Terahara ........................ 398/79 |
| 2002/0101636 A1 | * | 8/2002 | Xiao et al. .................. 359/127 |
| 2002/0105694 A1 | | 8/2002 | DeGrange, Jr. et al. |

FOREIGN PATENT DOCUMENTS

| | | |
|---|---|---|
| EP | 1035680 A2 | 9/2000 |
| WO | WO 97/06616 A1 | 2/1997 |
| WO | WO 02/063811 A2 | 8/2002 |

OTHER PUBLICATIONS

PCT International Search Report International Application No. PCT/US 02/03489; filed Feb. 6, 2002.

* cited by examiner

*Primary Examiner*—Jason Chan
*Assistant Examiner*—David C. Payne
(74) *Attorney, Agent, or Firm*—Michael R. Cammarata

(57) ABSTRACT

To improve a power balance of an optical add/drop multiplexer, an add amplifier is optically coupled to an add path of an optical add/drop module. A through loss associated with a signal passing through the add/drop module, a drop loss associated with a signal travelling a drop path of the add/drop module, and an add loss associated with a signal travelling an add path of the add/drop module are known or otherwise calibrated values. A dropped channel power measurement is used in conjunction with the through loss, add loss, drop loss, number of dropped channels and number of added channels to determine an add path amplification value. The gain of the add amplifier is controlled according to add path amplification value so that the power level of the added channel(s) substantially matches the power level of the WDM signal output from the add/drop multiplexer. Furthermore, the gain profile of the add amplifier preferably matches a gain profile of a signal input to the add/drop module. In this way, the power level and gain profile of the added channel(s) can be controlled to match the power level and gain profile of the signal passing through the add/drop module.

23 Claims, 11 Drawing Sheets

POWER BALANCED OPTICAL ADD/DROP MULTIPLEXER AND POWER BALANCING METHODS THEREFORE

BACKGROUND OF THE INVENTION

The present invention relates to an optical add/drop multiplexer (OADM) and a control method therefore. More specifically, the invention relates to an optical add/drop multiplexer with a controlled add amplifier and a method of controlling an add amplifier of an OADM. The invention also relates to an optical add multiplexer (OAM) and a control method therefore.

Wavelength division multiplexing (WDM) is a burgeoning field. The reason so much interest surrounds WDM is the ability to transmit a large amount of information. Each of the wavelengths in a WDM system may carry in excess of 40 Gb/sec and advances in the WDM field are expected to increase the capacity of each wavelength dramatically. Moreover, the number of channels or operating wavelengths is also expected to increase dramatically.

One of the common problems faced by WDM systems and the vendors making WDM equipment is spectral flatness. A spectrally flat signal in which all of the channels have substantially the same gain is preferred because such a signal may be transmitted a longer distance without regeneration while still permitting the constituent channels to be distinguished from one another by a receiver.

To that end, WDM equipment vendors have invested large sums inventing gain-flattened optical amplifiers designed to impart substantially equal gain to signals over the operating wavelength range.

As recognized by the inventors, however, problems occur when an OADM (optical add drop multiplexer) is used to add and drop channels. Specifically, the power balance may be significantly affected when channels are added or dropped and added to a WDM signal.

One method of achieving the desired power balance for a WDM system with an OADM is disclosed in U.S. Pat. No. 6,069,719 (the Mizrahi patent). In that patent, a optical amplifier is placed before or after the OADM to balance or adjust the power levels of the WDM signal.

SUMMARY OF THE INVENTION

Although the Mizrahi patent does help flatten or otherwise equalize the power levels of the WDM channels, the technique disclosed therein is not sufficient in all cases.

One such case is when the power level of the channels to be added is quite different than the power levels of the main WDM signal. In such a case, placing an amplifier at the output of the OADM may not provide a sufficiently flat power balance.

Another case occurs due to the add loss, drop loss and through loss of the OADM which may have significant values. "Drop Loss" as it is defined herein is the power loss incurred by a signal passing through an OADM module drop path. Likewise, "Add Loss" as it is defined herein is the power loss incurred by a signal passing through an OADM module add path and "Through Loss" is defined herein is the power loss incurred by a signal passing through an OADM module through path.

Another case occurs when the numbers of channels being added, dropped and passed vary. In such a case, the power balance of the WDM signal output from the OADM may be negatively impacted.

The present invention solves the above-identified and other problems with conventional OADMs and OAMs by providing power balanced systems and methods.

Therefore, the inventors hereby disclose an optical communications apparatus for power balancing a wavelength division multiplexed (WDM) signal output from an add/drop module adding at least one channel to and dropping at least one channel from a signal input thereto, including: a gain element optically coupled to the add/drop module and to an add channel port receiving the at least one channel to be added; the gain element imparting optical gain to the at least one channel received from the add channel port; a controller operatively coupled to the gain element, the controller receiving a dropped channel power measurement of the at least one dropped channel dropped from the add/drop module; the controller determining an add path amplification value based on the dropped channel power measurement, a through loss associated with a signal passing through the add/drop module, a drop loss associated with a signal travelling a drop path of the add/drop module; and an add loss associated with a signal travelling an add path of the add/drop module; and the controller controlling the gain element according to the add path amplification value.

The controller may also receive a number of channels to be added by the add/drop module, a number of channels to be dropped by the add/drop module, or both. This channel count information may then be used to help determine the add path amplification value.

In order to measure the dropped channel power, the invention may use a coupler optically coupled to a drop output of the add/drop module, an optical-to-electrical converter optically coupled to the coupler, the optical to-electrical coupler receiving a portion of light from the at least one dropped channel. The controller may then determine the dropped channel power measurement from an output of the optical-to-electrical converter.

To more accurately control the add path amplification, the controller may also receive an added channel power measurement of the least one added channel being added to the input signal by the add/drop module. The controller may then feedback control the gain element based on the added channel power measurement and the add path amplification value.

In addition to power matching, the invention may also use a gain element having a gain profile substantially matching a gain profile of a signal input to the add/drop module.

Alternatively, an input amplifier may be optically coupled an input port of the add/drop module and receive a plurality of input channels. In this case, the gain element may be designed to have a gain profile substantially matching a gain profile of the input amplifier.

A drop amplifier may also be optically coupled to the drop port of the add/drop module to amplify the dropped channels.

In addition, an output amplifier may be optically coupled to the add/drop module to amplify the output of the add/drop module. This output amplifier may also perform gain flattening amplification for the signal output from the add/drop module.

There are a variety of ways to construct the gain element. One such way is to use an add amplifier. The controller may then control the add amplifier according to the add path amplification value.

Alternatively, the gain element may include an add amplifier and a variable optical attenuator. The controller may then control the variable optical attenuator and/or the add amplifier according to the add path amplification value.

The invention also includes a method of power balancing a wavelength division multiplexed (WDM) signal output from an add/drop module adding at least one channel to and dropping at least one channel from a signal input thereto, including: receiving a dropped channel power measurement of the least one dropped channel dropped from the add/drop module; determining an add path amplification value based on the dropped channel power measurement, a through loss associated with a signal passing through the add/drop module, a drop loss associated with a signal travelling a drop path of the add/drop module; and an add loss associated with a signal travelling an add path of the add/drop module; and controlling an add path amplification of the add path according to the add path amplification value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices.

Furthermore, the term "connection" and "operative connection" as used herein is a relative term and does not require a direct physical connection. For example, controller 70 may communicate with other elements by using a communication pathway over a fiber span, an Internet connection, or wireless communication pathway. Such alternative communication pathways may be convenient in view of the potentially physically distinct locations that may be provided for the various elements.

Figure 1:
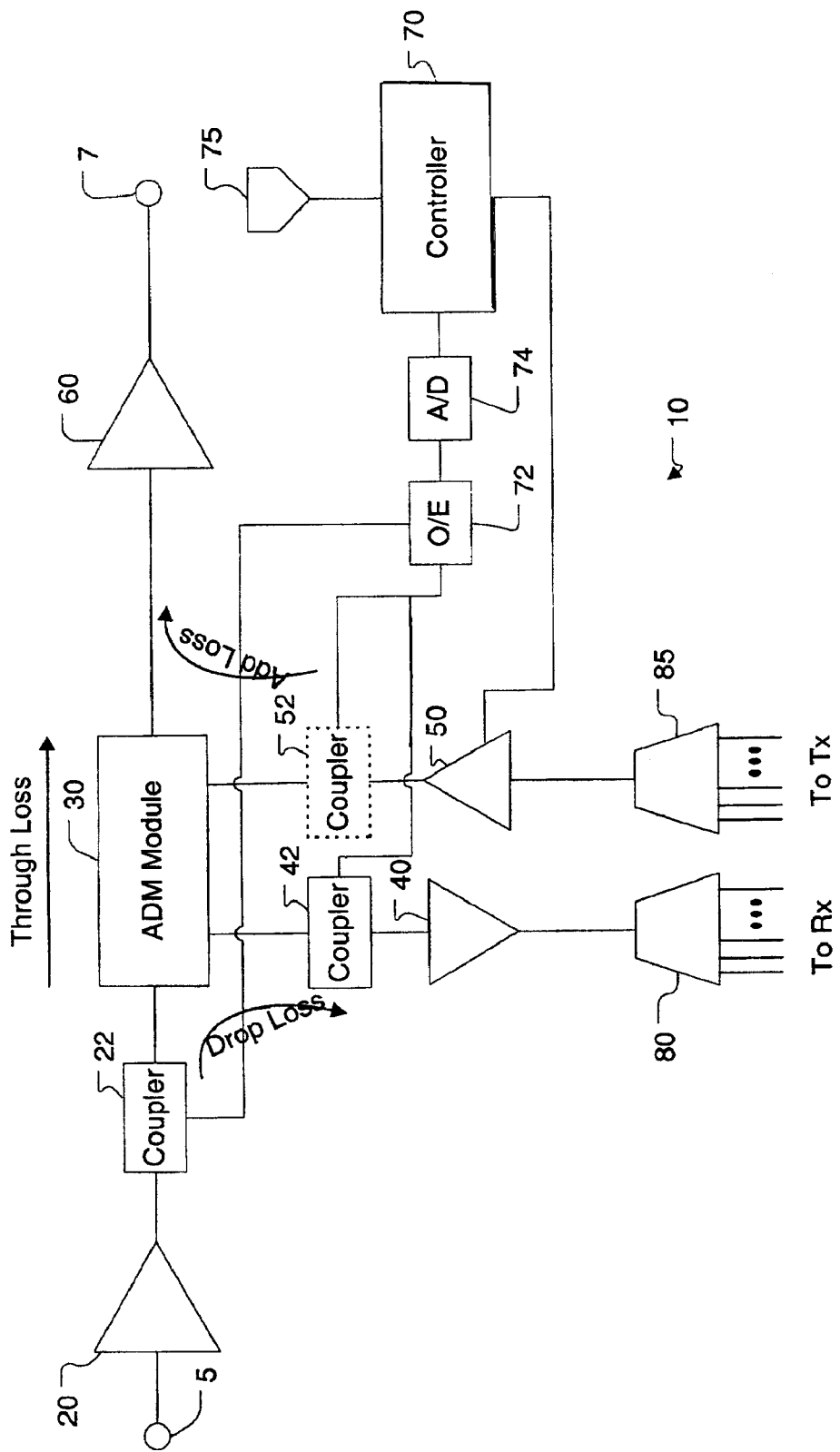
FIG. 1 is a block diagram of an optical add drop multiplexing system according to the invention.

FIG. 1 illustrates an OADM system 10 according to a first aspect of the invention. An exemplary construction of the invention, as shown in FIG. 1, includes an add/drop multiplexing (ADM) module 30. The ADM module 30 may be optically coupled mid-span such as between an input amplifier 20 and output amplifier 60 shown in FIG. 1. It is to be understood that the input and output amplifiers 20, 60 are not necessary for the invention to operate and that the location of the ADM module 30 shown in the figures is exemplary in nature.

The ADM module 30 is, by itself, a conventional element that may be constructed in a variety of fashions including a variety of components. For example, the ADM module may be constructed with a static add/drop multiplexer as described in U.S. Pat. No. 6,069,719; with the add/drop multiplexers shown and described in U.S. Pat. Nos. 6,002,503; 5,778,118; 5,748,349; or 5,982,518; or with any other known or future-developed OADM. At a minimum, the ADM module 30 should have the capability to add one or more channels to an available or otherwise unoccupied channel slot(s) of a WDM signal. The ADM module 30 may also have the capability to drop one or more channels to make a channel slot available to the signal to be added.

The ADM module 30 will typically utilize wavelength selective elements such as Bragg gratings, thin film filters, and/or arrayed waveguide gratings to add and drop channels. While the particular construction of the ADM module 30 is largely irrelevant to the invention, a material point is that the ADM module will have various optical losses associated with the three main optical signals paths (add, drop and through).

More specifically and as indicated on FIG. 1, the ADM module 30 has an associated Drop Loss which is the power loss associated with a signal passing through the drop path of the ADM module 30. The ADM module 30 also has an associated "Through Loss" which is the power loss incurred by a signal passing through the ADM module 30. The ADM module 30 also has an Add Loss associated therewith that is the power loss associated with a signal passing through the add path of the ADM module 30.

The drop, through, and add paths may only include the ADM module 30 as shown in FIG. 1 and the respective internal drop, through and add paths within ADM module 30. The add, drop and through paths may also include other components such as connectors, isolators, and fiber situated along the respective paths and may be either internal or external to the ADM module 30.

The add, drop and through losses are preferably measured before the system is installed. In other words, the add, drop and through losses are known, calibrated values stored within or retrievable by the controller 70.

As further shown in FIG. 1, the OADM system 10 also includes a drop amplifier 40 optically coupled to a drop output port of ADM module 30 and an add amplifier 50 optically coupled to an add input port of the ADM module 30.

The drop amplifier 40 and add amplifier 50 may be constructed with a variety of known or future developed amplifiers such as Erbium doped fiber amplifiers, other rare-earth doped fiber amplifiers, Raman amplifiers, Brillouin amplifiers or a combination thereof having one or more stages of amplification. As is also known in the art, one or more pump lasers are typically coupled to the active optical fiber (e.g. rare-earth doped fiber) in one or more stages of each amplifier to excite the fluorescent material or to stimulate Raman and/or Brillouin amplification. In general, the pump light is of sufficient magnitude and the composition of optical fiber being pumped is such that the optical signals output from each stage are amplified.

Preferably, the add amplifier 50 has a gain profile similar to the gain profile of input amplifier 20 or otherwise similar to the gain profile of a signal input to the ADM module 30. The reason for this is discussed below in more detail. Briefly, it is preferable to substantially match the gain profiles because the added channels should be amplified to match the WDM signal output from the ADM module 30 according to the concepts of the present invention.

Various power measurements are taken by the invention (as represented by couplers 22, 42, and 52) and supplied to controller 70. Couplers 22, 42, and 52 may constructed with a conventional tap or splitter so that a small amount of light (e.g. approximately 2% of the input power fed thereto) is fed to the an optical-to-electrical (O/E) converter 72 that may be constructed with a conventional element such as a photo-detector. The electrical signal may then be converted to a digital signal by analog-to-digital (A/D) converter 74.

In practice, there may be one O/E converter 72 and one A/D converter 74 per power measurement point. Moreover, the A/D converter 74 would be unnecessary if the controller 70 is implemented with analog circuitry.

Controller 70 may be constructed in a variety of fashions utilizing electronic components, optical components, computer hardware, firmware, software or a combination thereof. Controller 70 may also utilize processing resources of an existing controller such as a network element controller, terminal controller, or network managing controller that already exists in the communication system to which the system 10, 11, 12, 13 or 14 is connected.

It is to be understood that a variety of devices and methods can be utilized to measure power at certain points in the optical path and that the couplers (22, 42, and 52) shown in the figures are but one example of these alternatives. Indeed, the amps (e.g. 20, 40, 50 and 60) as well as the ADM module 30 may have the capability to measure input and output power levels and supply the measurement or a value indicative thereof to controller 70.

A relevant point is that controller 70 is supplied with various power level measurement values. Specifically, the controller 70 receives power level measurement values via couplers 22 and 42 indicative of the input power level and dropped channel power level.

In the preferred embodiment, the controller 70 also receives a measurement of the actual power output from the add amp 50 via coupler 52. While coupler 52 is shown in dotted lines to indicate that this element is optional, including coupler 52 or its equivalent to measure the power output by add amp 50 permits the controller 70 to more accurately control the add amplifier 50 through a feedback loop.

The controller 70 also stores or receives the following values: Drop loss, Add Loss and Through Loss. As mentioned above, the Drop Loss, Add Loss and Through Loss are preferably measured or calibrated at, for example, the factory and are known (e.g. stored or received) by controller 70.

Controller 70 preferably operates so as to match the added channel power level with the optical signal power level output from the ADM module 30. One way in which to accomplish this inventive goal is for the controller 70 to control the amplification or gain imparted by add amp 50 to the channels to be added to the WDM signal in the ADM module 30. Conceptually, the add channel power may be calculated by determining the dropped channel power as if the dropped channels had propagated through the ADM module 30. In other words, the add channel power is based on the dropped channel power plus an offset where the offset accounts for the gains and losses associated with the dropped channels actually passing through the ADM module 30. An exemplary equation to achieve this goal is as follows:

$$P_{add} = P_{drop} + \text{Offset} \quad \text{Equation (1)}$$

where
Offset=Drop Loss+Add Loss−Through Loss (respective losses associated with a signal travelling the drop path, add path and through path of ADM module 30 in dBm)
$P_{add}$=the power per channel added (absolute power of added channels divided by number of added channels, then converted to dBm)
$P_{drop}$ is the power per channel dropped (absolute power of dropped channels as measured via coupler 42 divided by number of dropped channels, then converted to dBm) substituting Offset in Equation (1) leaves:

$$P_{add} = P_{drop} + (\text{Drop Loss} + \text{Add Loss} - \text{Through Loss}) \quad \text{Equation (2)}$$

The above equations are on a per-channel basis. Since ADM 30 may add more than one channel, an additional calculation may be necessary in order for controller 70 to command the appropriate output power level (add path amplification value) of the add amp 50. Specifically:

$$P_{addtotal} = P_{add} + 10 \log N_{add} \quad \text{Equation (3)}$$

where
$P_{addtotal}$=desired amplification in dBm at output of the add amp 50.
$N_{add}$=number of added channels.
Substituting for $P_{add}$ leaves:

$$P_{addtotal} = P_{drop} + (\text{Drop Loss} + \text{Add Loss} - \text{Through Loss}) + 10 \log N_{add} \quad \text{Equation (4)}$$

In some cases such as when there is a fiber cut such that no channels will be dropped while one or more channels are added by ADM 30 or when ADM 30 is otherwise asymmetric and adds but does not drop channels. Alternatively, the ADM module 30 may be replaced by an add module 32 as shown in FIG. 5 which only has the capability to add but not drop channels. For any of the system configurations 10–14 shown in FIGS. 1–5, the add power calculation changes when no channels are being dropped. Specifically, $$P_{add} = P_{in} + \text{OffsetNoDrop} \quad \text{Equation (5)}$$

where $P_{in}$=the power per channel input to ADM 30 (absolute power of input channels as measured via coupler 22 divided by number of input channels, then converted to dBm)

OffsetNoDrop=Add Loss−Through Loss

Substituting OffsetNoDrop in Equation (5) leaves:

$$P_{add}=P_{in}+(\text{Add Loss}-\text{Through Loss}) \quad \text{Equation (6)}$$

Again, this equation is on a per-channel basis. Therefore, accounting for the total number of added channels leaves the following equation for the add path amplification value:

$$P_{addtotal}=P_{add}+10\text{Log}N_{add} \quad \text{Equation (7)}$$

where $P_{addtotal}$=desired amplification in dBm at output of the add amp 50.

$N_{add}$=number of added channels.

Substituting for $P_{add}$ leaves:

$$P_{addtotal}=P_{in}+(\text{Add Loss}-\text{Through Loss})+10\text{Log } N_{add} \quad \text{Equation (8)}$$

Because the OADM systems 10–13 of FIGS. 1–4 and ADM system 14 of FIG. 5 may process WDM signals comprised of more than one channel (wavelength), the controller 70 preferably has knowledge of the number of channels input, dropped and added. To that end, controller 70 may include an input 75 which inputs information relating to the number of channels being dropped and added with respect to ADM module 30. It is to be understood that a subset of this information may be sufficient for the invention to operate correctly. For example, if the ADM module 30 is symmetric and always drops and adds a fixed number of channels, then it would be sufficient to know these number(s). A controller 70 working with an asymmetric ADM module 30 generally requires both add and drop channel count information.

The input 75 may be from a variety of sources one of which is a service channel which may be a separate wavelength of the WDM signal separate from the data wavelengths. Alternatively, the channel count information may be transmitted to the input 75 via a network separate from the WDM signal such as an Ethernet connection, wireless connection or WWW (world wide web) connection. If the number of channels being transmitted, dropped and added are fixed, the input 75 may simply be from a register or other memory device operatively connected to the controller 70. Still further, the channel count information may be manually input via, for example, a craft terminal connected to input 75.

Input 75 may also be used to input the calibrated Drop Loss, Through Loss and Add Loss values. Alternatively, these values may be programmed into or otherwise stored by controller 75 without using input 75.

The $P_{addtotal}$ value calculated above may used to control the add amplifier 50. More specifically, the $P_{addtotal}$ value may used by controller 70 to command the pump lasers (not shown) within add amp 50 to tune the output power to $P_{addtotal}$.

To increase the accuracy of the output power, a feedback loop is preferably used. To that end, an add amp 50 output power measurement is taken via coupler 52. This add amp 50 output power measurement is compared against $P_{addtotal}$ to feedback control the add amp 50. This invention contemplates using conventional feedback control methods in this new environment to achieve more precise control.

In addition to controlling the added channel power level, it is also preferable to match the gain profiles of these two signals. One way in which to accomplish this inventive goal is for the gain profile of add amp 50 to substantially match the gain profile of the input amp 20 or otherwise substantially match the gain profile of the WDM signal input to the ADM module 30. If the input amp 20 is used, a simple way to accomplish this goal is to use the same type of amplifier for input amp 20 and add amp 50. Since the added channels typically comprise only a portion of the total WDM spectrum the gain profile match need only be with respect to the added channel spectrum and not necessarily the total WDM spectrum.

The output of the ADM module 30 is preferably optically coupled to an output amp 60 as further shown in FIG. 1. The output amp 60 is preferably a gain-flattened amplifier having a frequency response that substantially flattens the frequency spectrum of the signal output from amp 60. Such gain-flattened amplifiers are generally available and typically include a plurality of amplifier stages, variable optical attenuators, gain flattening filters and the like to impart the relatively flat gain profile. The inventive processing of the added channels which seeks to match the gain and frequency profile of the added channels to the channels passing through the ADM module works particularly well with a gain-flattened output amp 60. The reason is that the amp 60 need not compensate for a different power level or frequency profile for the added channels and can thereby provide a overall flatter gain response for the WDM signal.

The invention is not limited to the equations or examples described above in relation to FIG. 1. A variety of changes to the OADM system 10 structure and the methods performed thereby are within the scope of invention.

Figure 2:
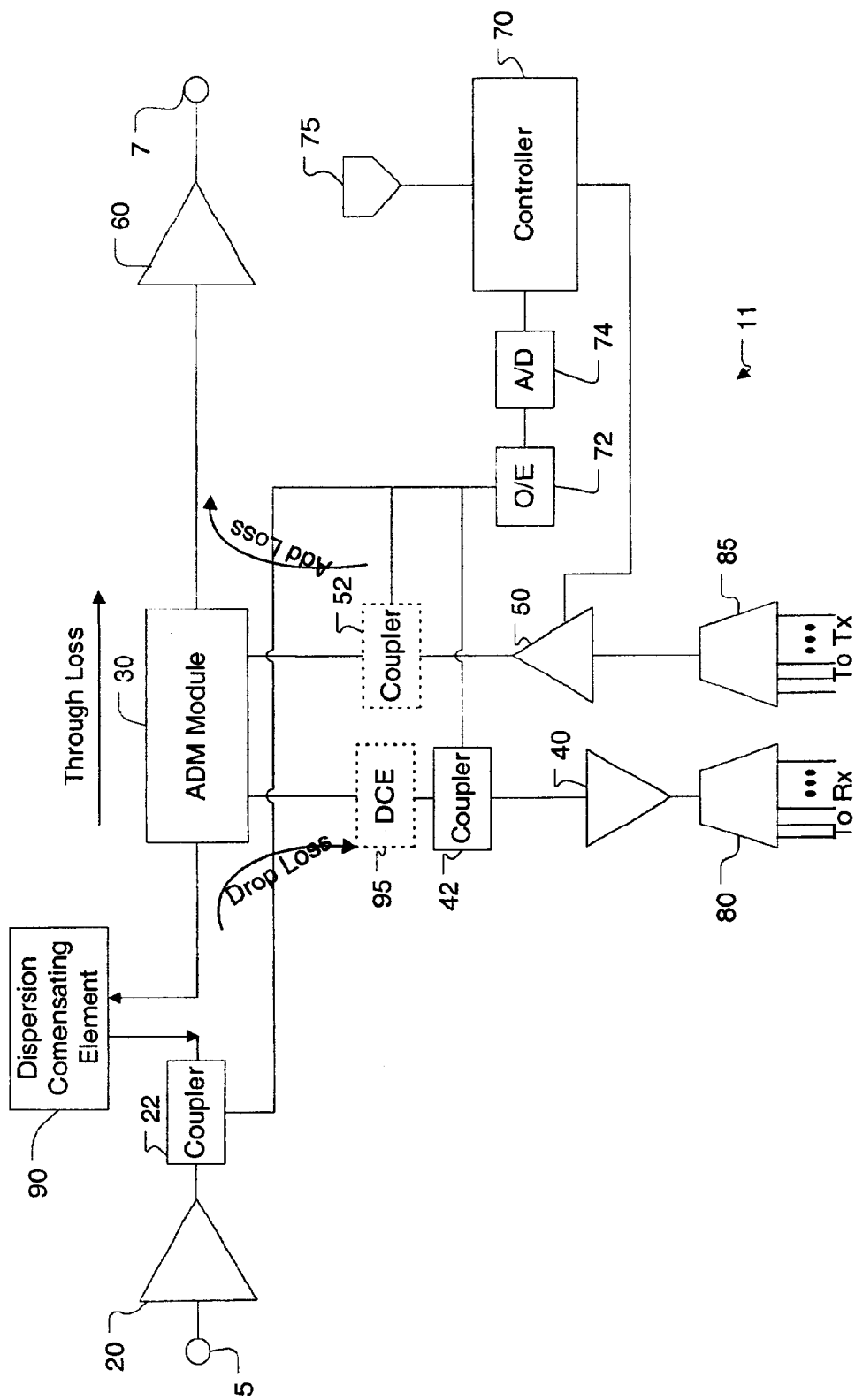
FIG. 2 is a block diagram of another optical add drop multiplexing system according to the invention.

Indeed, FIG. 2 shows one such variation on this theme which is to add one or more dispersion compensating elements to the OADM system 11. FIG. 2 is the preferred embodiment in which a first dispersion compensating element (DCE) 90 is optically coupled to the input of the ADM module 30. Dispersion compensating element 90 provides dispersion compensation for the optical signals output from the first amp stage 20 and input to the ADM module 30, and can include a variety of elements such as a segment of known dispersion compensating fiber (DCF) or a dispersion compensating Bragg grating or both.

An optional DCE 95 may also be coupled between the ADM module 30 and the drop amp 40 as also shown in FIG. 2. It is noted that a dispersion compensating element may also be provided at any appropriate location within any one of the embodiments of the present invention.

Other differences between the embodiments of FIGS. 1 and 2 are the input and drop path power values. By placing additional elements, namely DCEs 90 and 95, in the input and drop paths the amount of signal attenuation on each path will increase. Such attenuations should be accounted for when calculating the appropriate power level output by add amp 50. For example, the DCE 90 loss should be subtracted from the input power level $P_{in}$. The DCE 95 loss should be accounted for by the power measurement taken via coupler 42 since this power measurement point follows the DCE 95.

Figure 3:
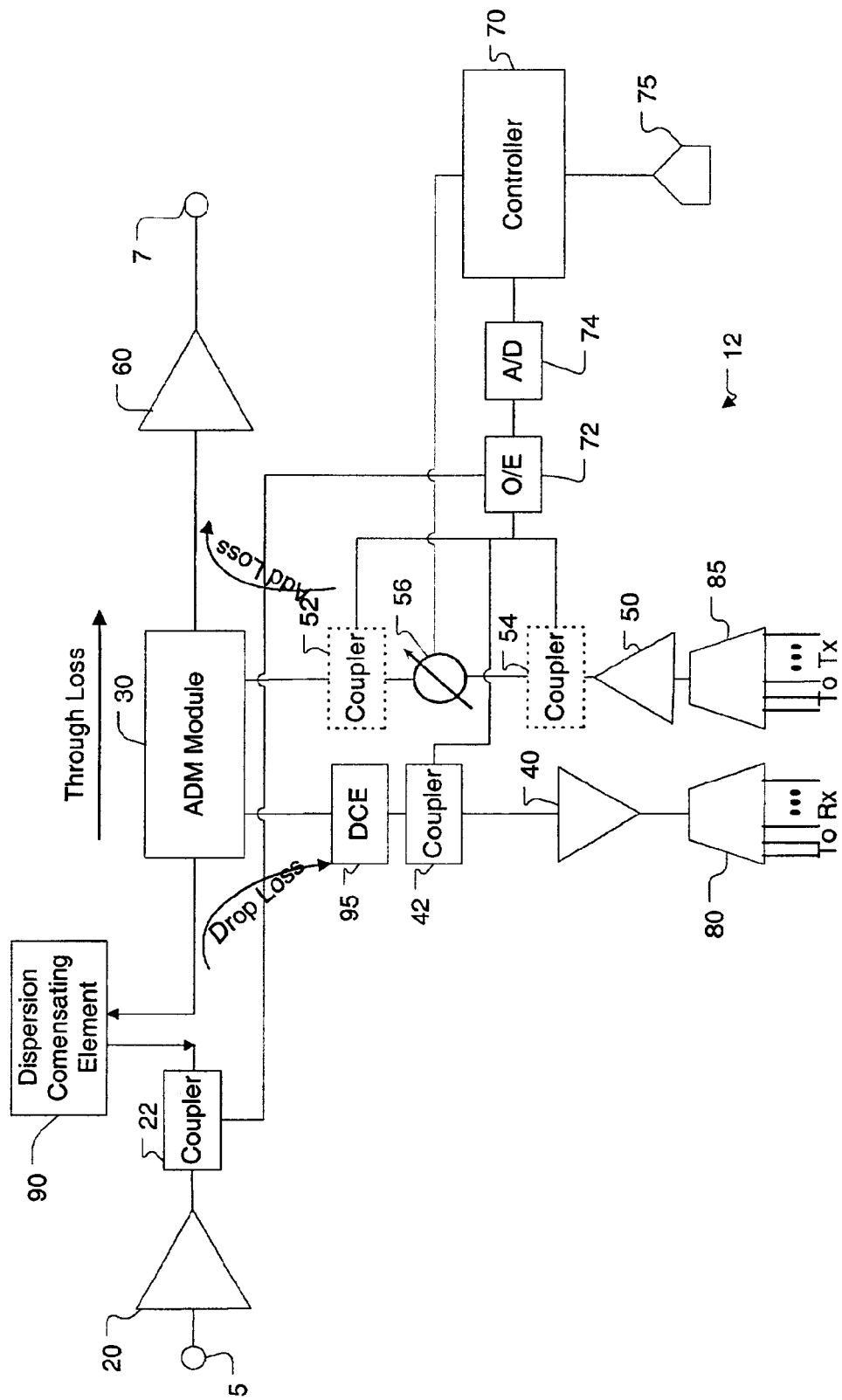
FIG. 3 is a block diagram of yet another optical add drop multiplexing system according to the invention.

FIG. 3 illustrates an alternative to achieving a desired add channel power. Instead of controlling the add amp 50 output power as described above, a variable optical attenuator (VOA) 56 may be utilized to control the add channel power. For example, the add amp 50 may be set to a relatively high amplification value that ensures sufficient amplification for the add channels. This high amplification may then be tuned by the VOA 56 to provide the desired add channel power value. The controller 70 may exercise this control over VOA 56 in accordance with the descriptions above. The VOA 56 may be a separate element or provided within the add amp 50.

Optional coupler 52 may be used to create a feedback loop to ensure that the add channel power is equal to the desired value.

In addition, both the add amp 50 and VOA 56 may be controlled by controller 70 to produce the desired add channel power value. In other words, the controller 70 may seek to find an appropriate balance between the amplification imparted by add amp 50 and the attenuation imparted by VOA 56 to produce the desired add channel power value. In this alternative, optional couplers 50, 52 may be used by controller to feedback control the add amp 50 and the VOA 56.

Although using a VOA 56 is within the scope of invention, it is generally not preferred because of the additional expense and complexity. Moreover, the necessary control over the add channel power value may be appropriately performed by the add amp 50.

FIG. 1 illustrates a typical interface between the ADM module 30 and the drop/add, output/input signal pathways. Namely, a demultiplexer 80 is typically used to separate the dropped WDM signals into component signals which may be supplied to a receiver (Rx). A multiplexer 85 is another component of a typical interface in which a plurality of signals from, for example, a transmitter (Tx) may be multiplexed into a WDM signal and supplied to the ADM module 30. Such demultiplexers 80 and multiplexers 85 are conventional elements the details of which are not necessary for the understanding of the current invention.

Figure 4:
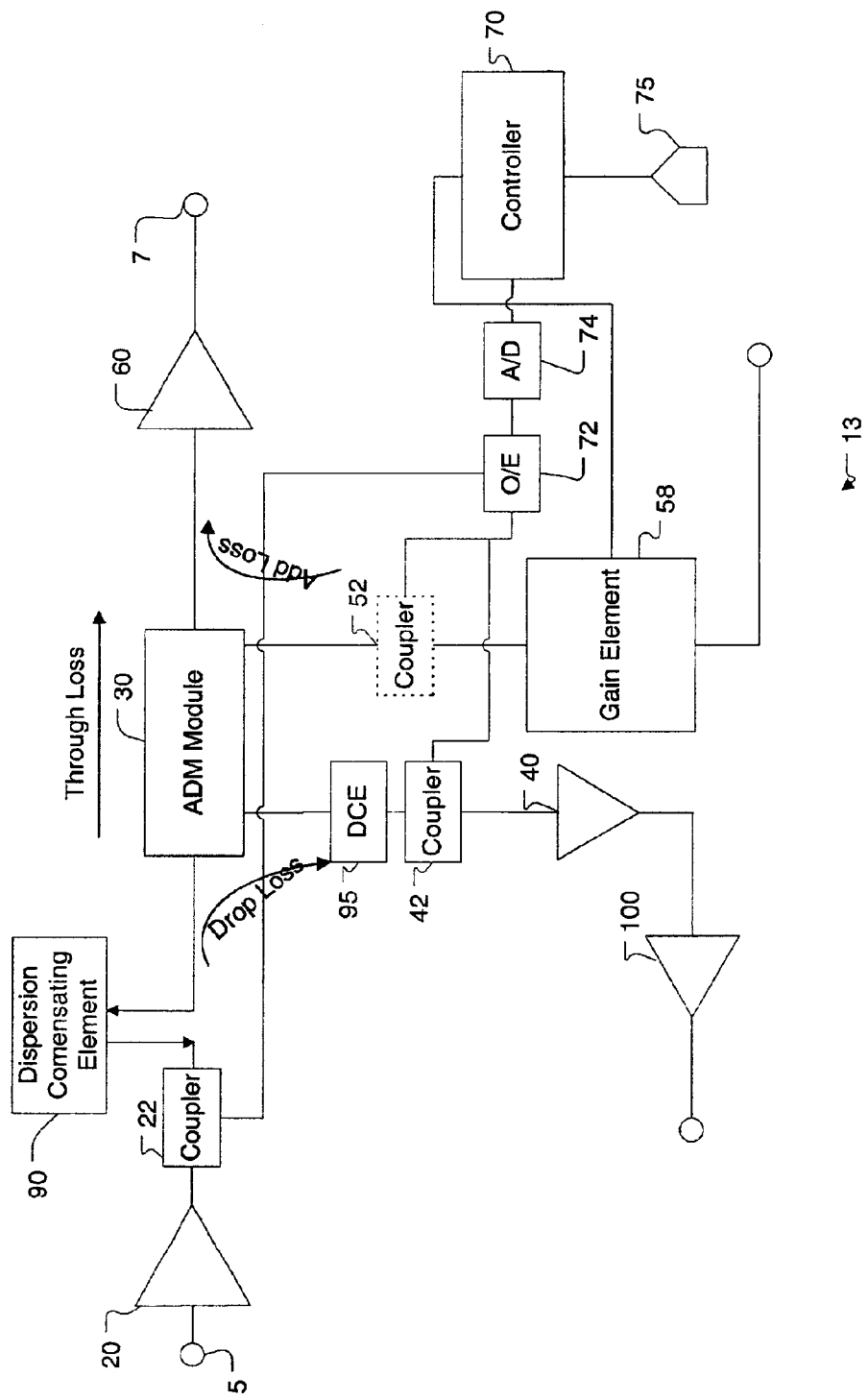
FIG. 4 is a block diagram of a still another optical add drop multiplexing system according to the invention.
Figure 5:
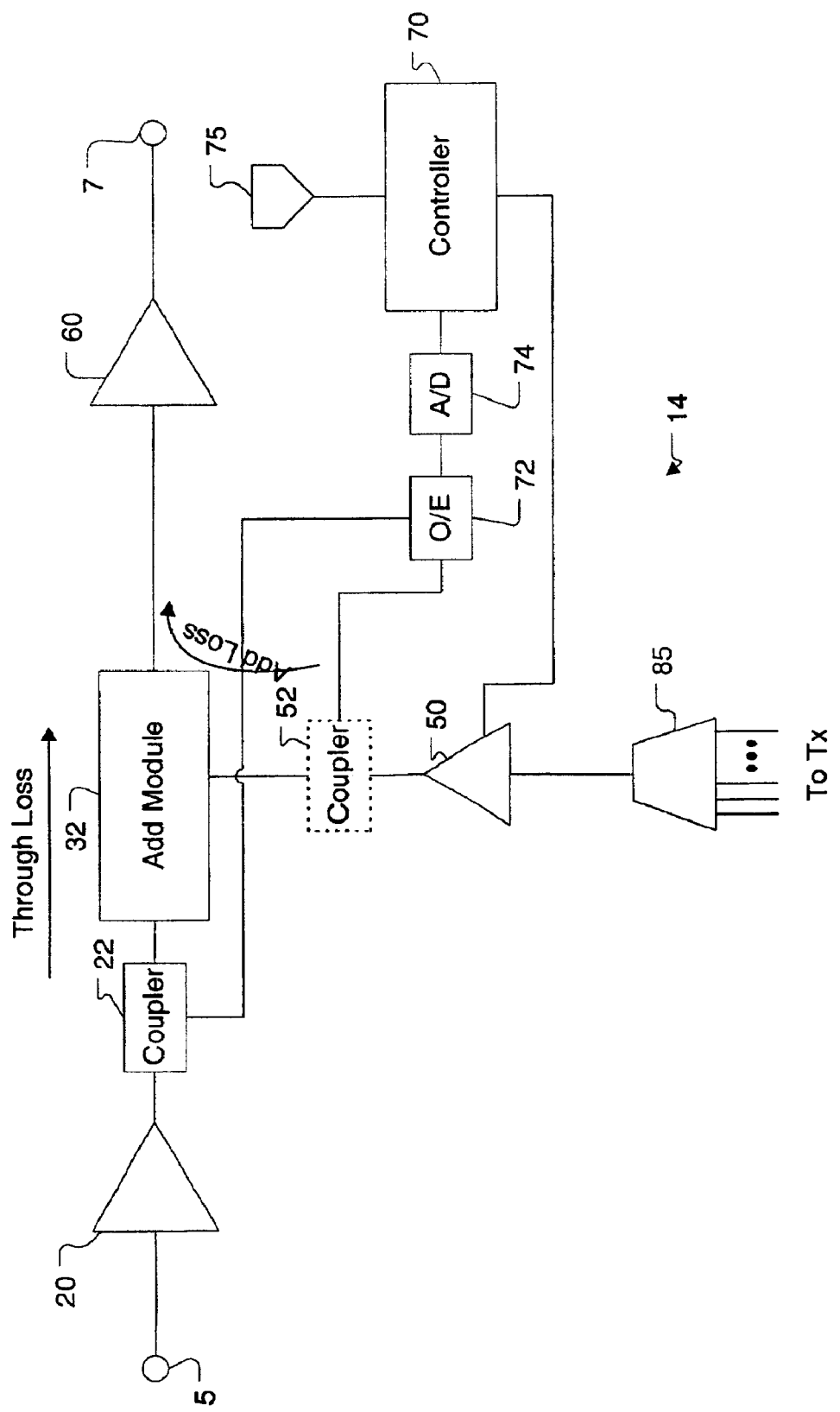
FIG. 5 is a block diagram of an optical add multiplexing system according to the invention.

FIG. 4 illustrates one of a variety of alternative interfaces. Instead of multiplexer 85 and demultiplexer 80 as in FIG. 1, the added and dropped channels may be supplied from/to another span or amplifier (e.g. the span to which add amp is connected or the amplifier 100 to which the drop amp 40 is connected). The illustrated amplifier 100 and span are merely examples of interfaces and may include a variety of other components. For example, the dropped channels may be supplied to another span or fiber plant for transmission. If there is more than one dropped channel, the signal being supplied will be a WDM-type signal.

FIG. 4 also illustrates a generalization of the add amp 50 and add amp 50/VOA 56 illustrated in previous figures. This generalized version is labeled a gain element 58 and may include an add amp 50 as in FIGS. 1–2, a combination of add amp 50 and VOA 56 as in FIG. 3 or any other combination of amplifiers and attenuators capable of adjusting the add path amplification in response to a command from controller 70. The gain element 58 may also be feedback controlled by controller 70 using the power measurement taken via coupler 52.

Moreover, the drop amplifier 40 is not necessary for the invention to operate. In other words, the focus of the present invention is on the add path amplification and the drop path amplification is a useful, albeit not strictly necessary, addition to the invention.

Figure 6:
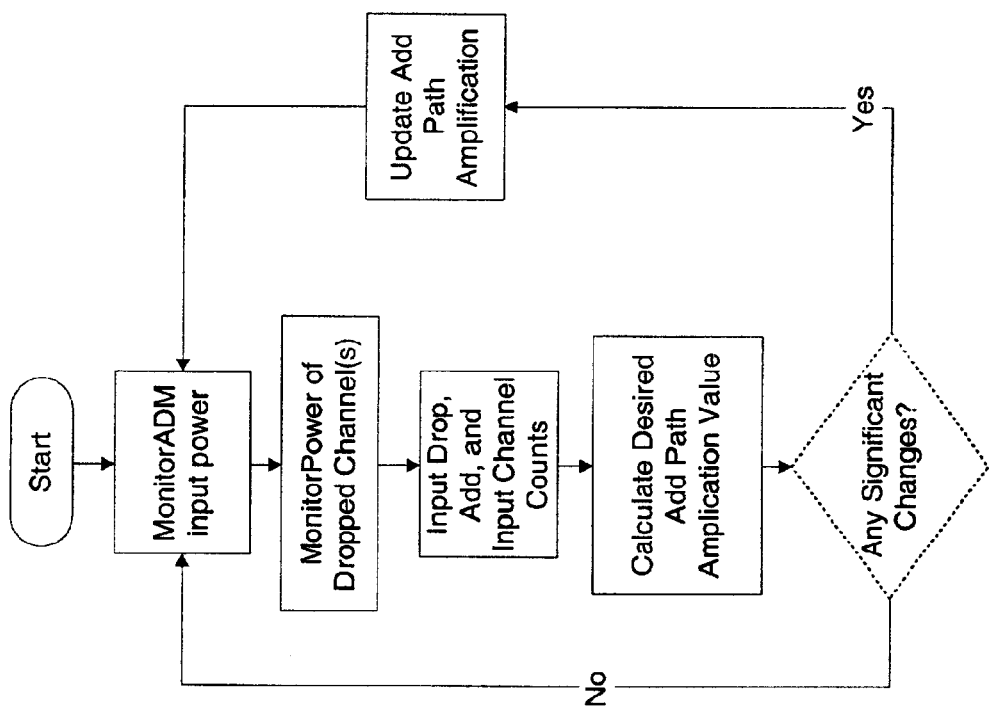
FIG. 6 is a high level flowchart illustrating an optical add drop multiplexer control methodology according to the invention.

FIG. 6 is an example of the method performed by the invention. This method may be performed by controller 70 to control the add amp 50, the VOA 56 or gain element 58.

As shown in FIG. 6, the inventive method includes monitoring the ADM 30 input power and the drop channel power. This may be accomplished as described above and involves measuring power via couplers 22 and 42.

As reflected in the above equations, the ADM input power does not need to be monitored if the ADM module 30 drops at least one channel. Furthermore, the dropped channel power does not need to be monitored if the ADM module 30 does not drop any channels.

The method also inputs the drop, add and input channel counts. As discussed above, only a subset of this information may be necessary such as just the add and drop channel counts.

The method may then calculate the desired add path amplification value. This calculation may be performed as described above.

An optional step may then be performed to determine whether any significant changes to the monitored or input values have occurred. The degree of change sufficient to trigger a calculation and add amplification update may be adjusted or eliminated entirely to tune the system performance. The degree of change may be detected by tracking or otherwise storing previously monitored or input values. In addition, the change may relate to only one or a subset of the all values monitored or input. For example, at least a 2% change in the dropped channel power may be deemed a "significant" change meriting controlling the add path amplification to reach an updated value.

If a change has occurred (or when this step is eliminated), then the method changes the add path amplification by controlling the add amp 50 and/or the VOA 56. The method may continue in this fashion or may be triggered upon the occurrence of an event (e.g. the "any changes" decision step, the installation of systems 10–13; a time-out; or manual operation may be used as a triggering event for execution of the method).

Figure 7:
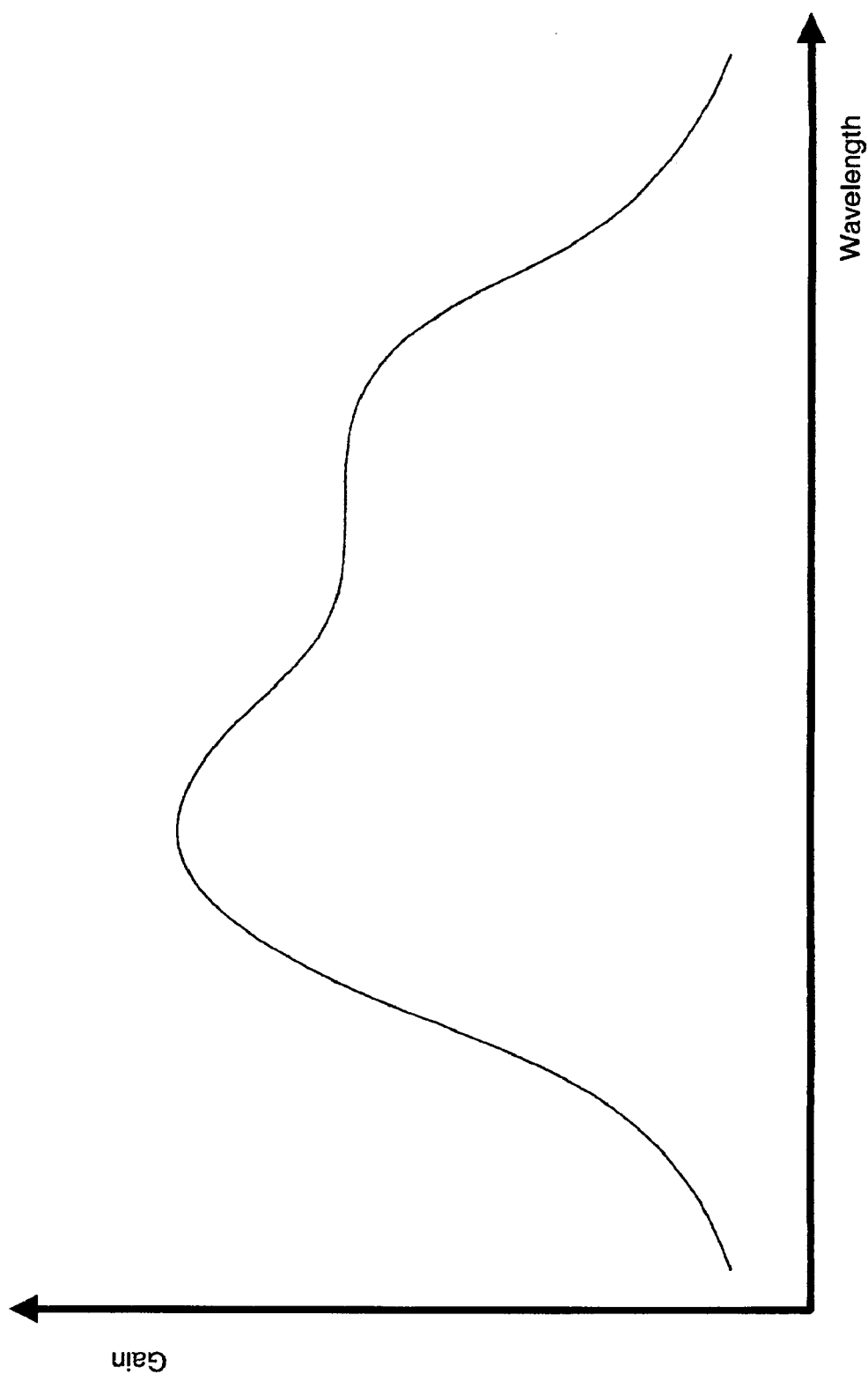
FIG. 7 is a graph illustrating a typical optical amplifier gain profile that is useful for illustrating the concepts of the invention.

FIGS. 7–11 further illustrate the concepts of the invention. FIG. 7 is a typical gain profile of a signal input to the ADM module 30. This gain profile may be preexisting (e.g. in case input amp is not used) or imparted by the input amp 20 if part of the system. The gain profile shown in FIG. 7 is but one, non-limiting example of a typical gain profile of a WDM signal.

Figure 8:
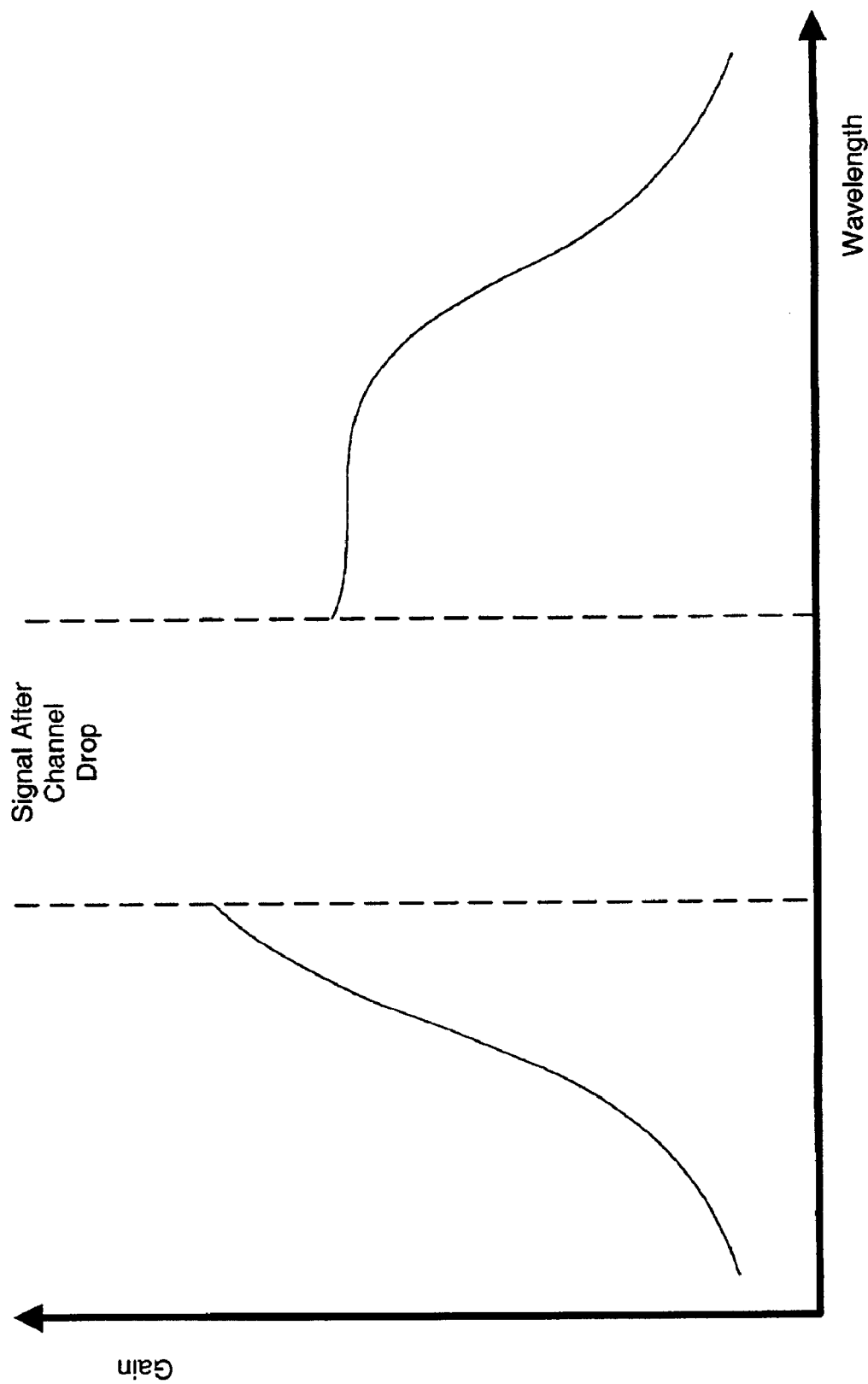
FIG. 8 is a graph illustrating a gain profile a signal passing through an optical add drop multiplexer after dropping channels.

FIG. 8 illustrates a typical gain profile of the WDM signal passing through ADM module 30 after dropping one or more channels onto the drop path. As shown therein, a gap in the profile exists and corresponds to the channel(s) that were dropped.

Figure 9:
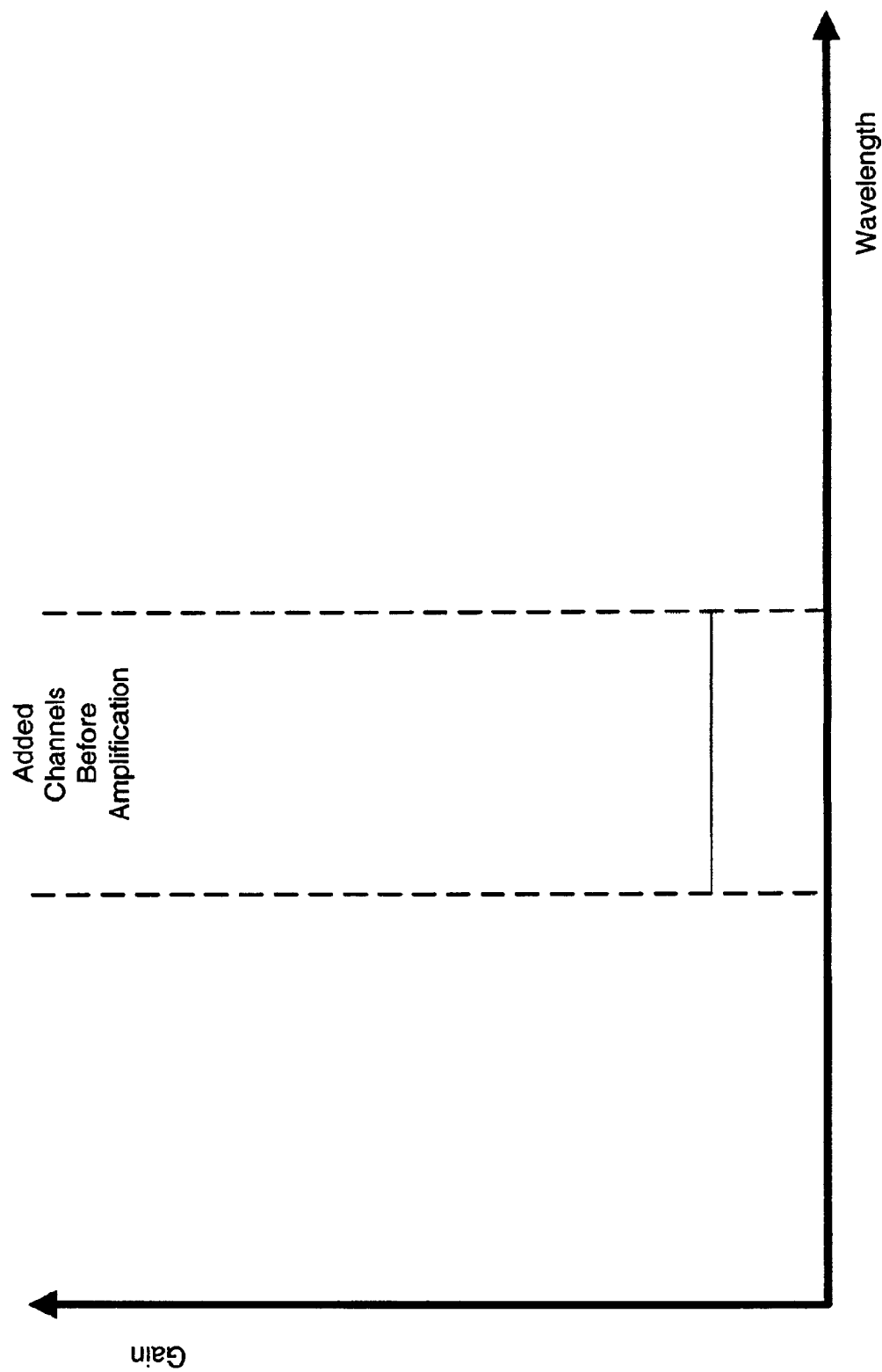
FIG. 9 is a graph illustrating a gain profile of channels to be added to a signal before amplification by an add amplifier according to the invention.

FIG. 9 illustrates the channels to be added before amplification. For example, the added channel(s) output from the multiplexer 85 may have a gain profile as shown in FIG. 9. For simplicity of illustration, the gain profile is flat but that is not always the case.

Figure 10:
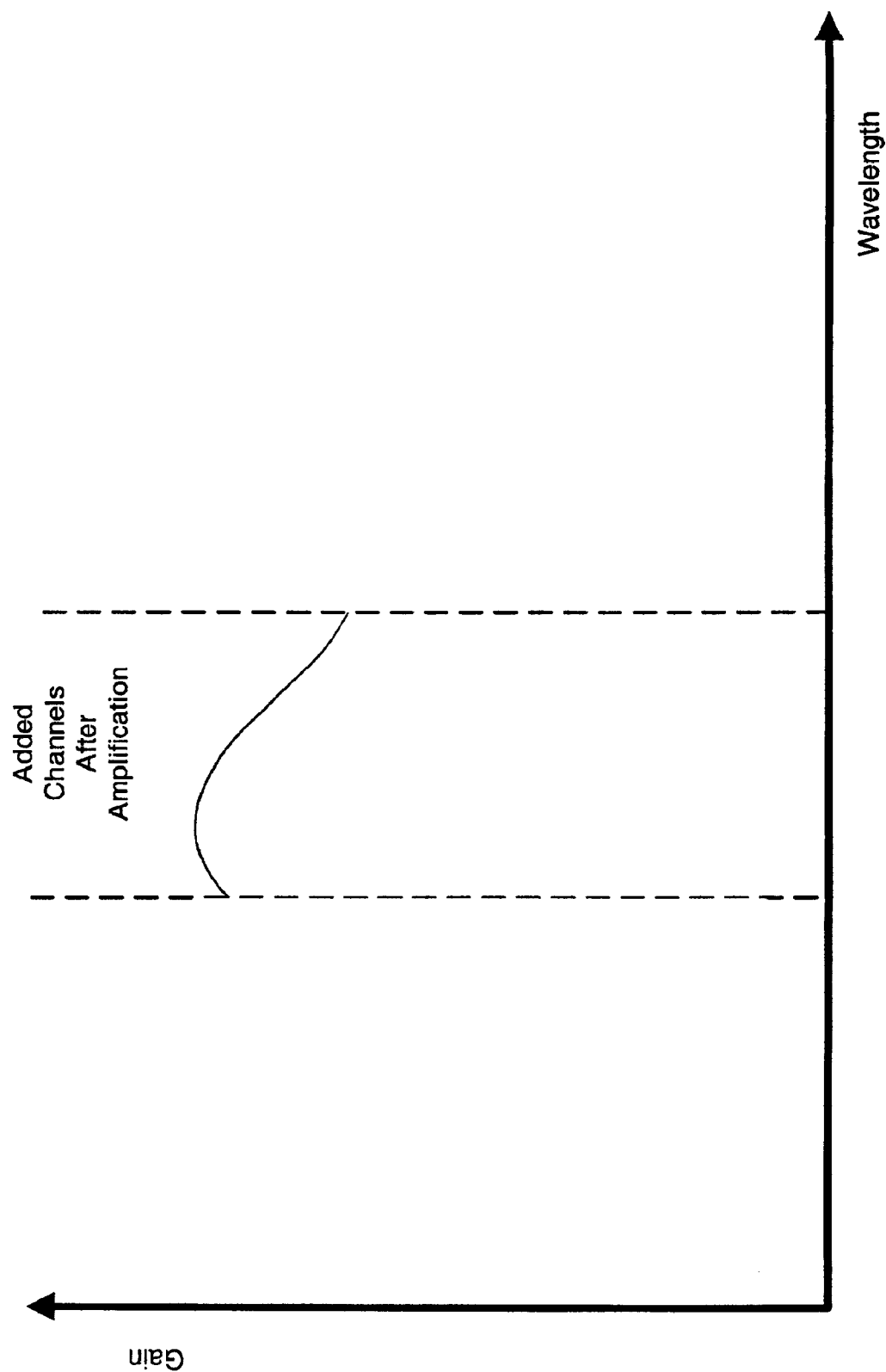
FIG. 10 is a graph illustrating a gain profile of channels to be added to a signal after amplification by an add amplifier according to the invention.

FIG. 10 illustrates the result of the inventive processing which is to match the power level and gain profile of the WDM signal. Specifically, the channels to be added (FIG. 9) are amplified by amp 50 to a level determined by controller 70.

If the preferred add amp 50 is used having a gain profile that substantially matches the gain profile of the WDM signal input to the ADM module 30, then the added channel (s) output from add amp 50 will preferably look like those shown in FIG. 10. The preferred result is that the combined signals (WDM signal after dropping and adding channels) will appear as shown in FIG. 7. In other words, the ADM 20 will appear power-transparent and insensitive to changes in the number of channels input, dropped, or added and or changes in the respective power values of the input, dropped, and added channels.

Figure 11:
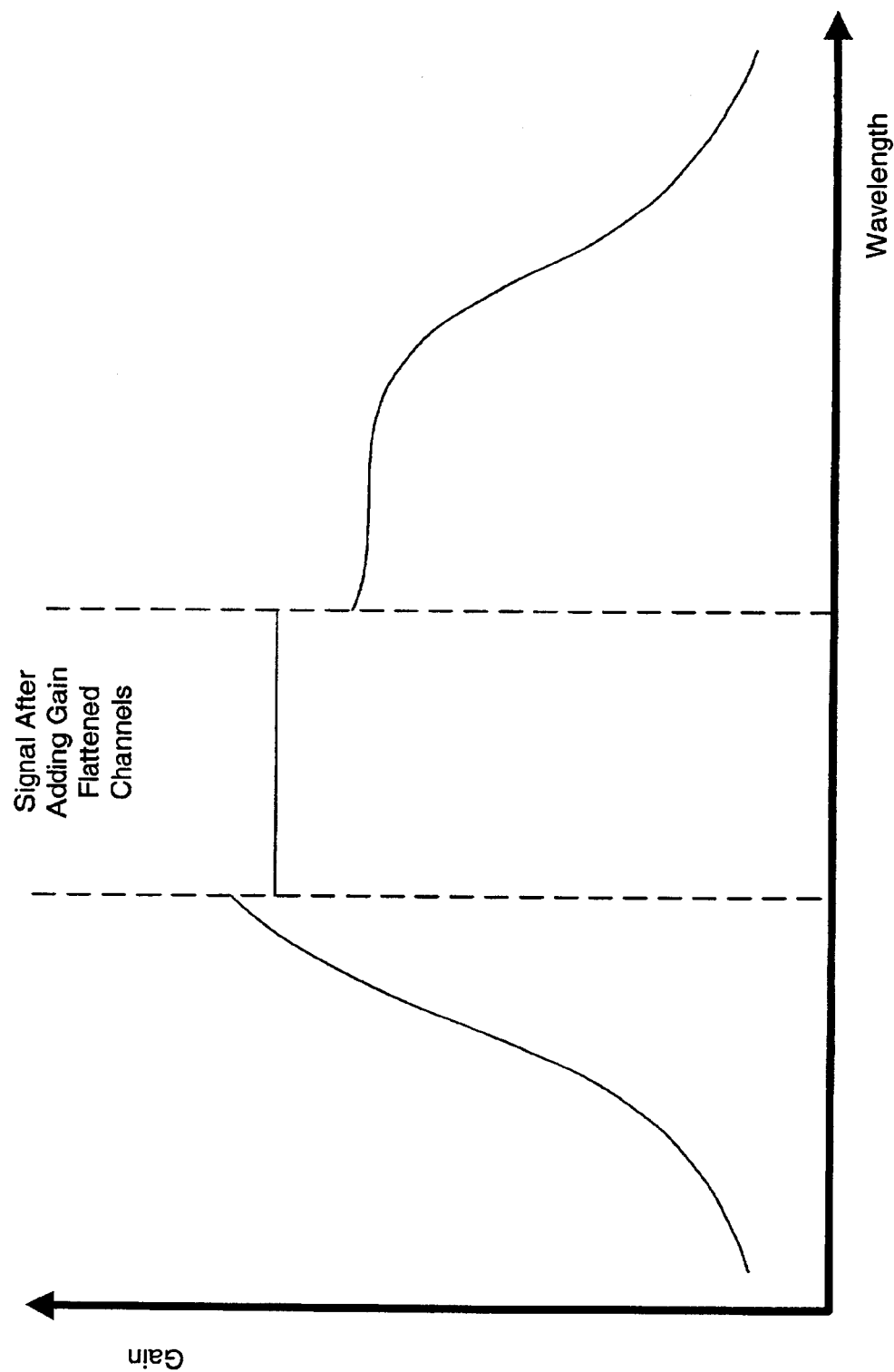
FIG. 11 is a graph illustrating a gain profile of channels to be added to a signal after amplification by an alternative add amplifier according to the invention.

For comparison sake, if the gain profiles do not match (e.g. the add amp 50 has a flat profile), then the combined signals (WDM signal after dropping and adding channels) may appear as shown in FIG. 11.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An optical communications apparatus for power balancing a wavelength division multiplexed (WDM) signal output from an add/drop module adding at least one channel to and dropping at least one channel from a signal input thereto, comprising:
   a gain element optically coupled to the add/drop module and to an add channel port receiving the at least one channel to be added;
   said gain element imparting optical gain to the at least one channel received from the add channel port;
   said gain element having a gain profile substantially matching a gain profile of the signal input to the add/drop module;
   a controller operatively coupled to said gain element,
   said controller receiving a dropped channel power measurement of the at least one dropped channel dropped from the add/drop module;
   said controller determining an add path amplification value based on the dropped channel power measurement, a through loss associated with a signal passing through the add/drop module, a drop loss associated with a signal travelling a drop path of the add/drop module; and an add loss associated with a signal travelling an add path of the add/drop module; and
   said controller controlling said gain element according to the add path amplification value.

2. The optical communications apparatus for power balancing a wavelength division multiplexed (WDM) signal according to claim 1,
   said controller receiving a number of channels to be added by the add/drop module;
   said controller determining the add path amplification value based on the number of channels to be added, the dropped channel power measurement, the through loss associated with a signal passing through the add/drop module, the drop loss associated with a signal travelling a drop path of the add/drop module; and the add loss associated with a signal travelling an add path of the add/drop module; and
   said controller controlling said gain element according to the add path amplification value.

3. The optical communications apparatus for power balancing a wavelength division multiplexed (WDM) signal according to claim 1,
   said controller receiving a number of channels to be dropped by the add/drop module;
   said controller determining the add path amplification value based on the number of channels to be dropped, the dropped channel power measurement, the through loss associated with a signal passing through the add/drop module, the drop loss associated with a signal travelling a drop path of the add/drop module; and the add loss associated with a signal travelling an add path of the add/drop module; and
   said controller controlling said gain element according to the add path amplification value.

4. The optical communications apparatus for power balancing a wavelength division multiplexed (WDM) signal according to claim 1,
   said controller receiving a number of channels to be added and a number of channels to be dropped by the add/drop module;
   said controller determining the add path amplification value based on the number of channels to be added, the number of channels to be dropped, the dropped channel power measurement, the through loss associated with a signal passing through the add/drop module, the drop loss associated with a signal travelling a drop path of the add/drop module; and the add loss associated with a signal travelling an add path of the add/drop module; and
   said controller controlling said gain element according to the add path amplification value.

5. The optical communications apparatus for power balancing a wavelength division multiplexed (WDM) signal according to claim 2,
   said controller determining the add path amplification based on the following equation:

$$P_{addtotal} = P_{drop} + (\text{Drop Loss} + \text{Add Loss} - \text{Through Loss}) + 10 \log N_{add}$$

where
   $P_{addtotal}$ = add path amplified power level in dBm,
   $P_{drop}$ = per channel power level of dropped signal output from drop port of add/drop module in dBm,
   Through Loss = loss associated with a signal passing through the add/drop module in dBm,
   Drop Loss = loss associated with a signal travelling a drop path of the add/drop module in dBm,
   Add Loss = loss associated with a signal travelling an add path of the add/drop module in dBm, and
   $N_{add}$ = number of added channels.

6. The optical communications apparatus for power balancing a wavelength division multiplexed (WDM) signal according to claim 1, further comprising:
   a coupler optically coupled to a drop output of the add/drop module,
   an optical-to-electrical converter optically coupled to said coupler, said optical to-electrical coupler receiving a portion of light from the at least one dropped channel;
   said controller determining the dropped channel power measurement from an output of said optical-to-electrical converter.

7. The optical communications apparatus for power balancing a wavelength division multiplexed (WDM) signal according to claim 1,
   said controller receiving an added channel power measurement of the least one added channel being added to the input signal by the add/drop module;
   said controller feedback controlling said gain element based on the added channel power measurement and the add path amplification value.

8. The optical communications apparatus for power balancing a wavelength division multiplexed (WDM) signal according to claim 1, further comprising:
   an input amplifier optically coupled an input port of the add/drop module and receiving a plurality of input channels;
   said gain element having a gain profile substantially matching a gain profile of said input amplifier.

9. The optical communications apparatus for power balancing a wavelength division multiplexed (WDM) signal according to claim 1, further comprising:
   a drop amplifier optically coupled to the drop port of the add/drop module, said drop amplifier amplifying the dropped channels.

10. The optical communications apparatus for power balancing a wavelength division multiplexed (WDM) signal according to claim 1, further comprising:
   an output amplifier optically coupled to the add/drop module;
   said output amplifier amplifying the output of the add/drop module.

11. The optical communications apparatus for power balancing a wavelength division multiplexed (WDM) signal according to claim 10,
   said output amplifier performing gain flattening amplification for the signal output from the add/drop module.

12. The optical communications apparatus for power balancing a wavelength division multiplexed (WDM) signal according to claim 1,
   wherein said gain element includes an add amplifier,
   said controller controlling said add amplifier according to the add path amplification value.

13. The optical communications apparatus for power balancing a wavelength division multiplexed (WDM) signal according to claim 1,
   wherein said gain element includes an add amplifier and a variable optical attenuator,
   said controller controlling said variable optical attenuator according to the add path amplification value.

14. The optical communications apparatus for power balancing a wavelength division multiplexed (WDM) signal according to claim 1,
   wherein said gain element includes an add amplifier and a variable optical attenuator,
   said controller controlling said variable optical attenuator and said add amplifier according to the add path amplification value.

15. A method of power balancing a wavelength division multiplexed (WDM) signal output from an add/drop module adding at least one channel to and dropping at least one channel from a signal input thereto, comprising:
   receiving a dropped channel power measurement of the least one dropped channel dropped from the add/drop module;
   determining an add path amplification value based on the dropped channel power measurement, a through loss associated with a signal passing through the add/drop module, a drop loss associated with a signal travelling a drop path of the add/drop module; and an add loss associated with a signal travelling an add path of the add/drop module;
   controlling an add path amplification of the add path according to the add path amplification value; and
   substantially matching a gain profile of the add path with a gain profile of a signal input to the add/drop module.

16. The method according to claim 15, further comprising:
   receiving a number of channels to be added by the add/drop module; and
   determining the add path amplification value based on the number of channels to be added, the dropped channel power measurement, the through loss associated with a signal passing through the add/drop module, the drop loss associated with a signal travelling a drop path of the add/drop module; and the add loss associated with a signal travelling an add path of the add/drop module.

17. The method according to claim 15, further comprising:
   receiving a number of channels to be dropped by the add/drop module; and
   determining the add path amplification value based on the number of channels to be dropped, the dropped channel power measurement, the through loss associated with a signal passing through the add/drop module, the drop loss associated with a signal travelling a drop path of the add/drop module; and the add loss associated with a signal travelling an add path of the add/drop module.

18. The method according to claim 15, further comprising:
   receiving a number of channels to be added and a number of channels to be dropped by the add/drop module; and
   determining the add path amplification value based on the number of channels to be added, the number of channels to be dropped, the dropped channel power measurement, the through loss associated with a signal passing through the add/drop module, the drop loss associated with a signal travelling a drop path of the add/drop module; and the add loss associated with a signal travelling an add path of the add/drop module.

19. The method according to claim 16, further comprising:
   determining the add path amplification based on the following equation:

$$P_{addtotal} = P_{drop} + (\text{Drop Loss} + \text{Add Loss} - \text{Through Loss}) + 10\text{Log } N_{add}$$

where
   $P_{addtotal}$=add path amplified power level in dBm,
   $P_{drop}$=per channel power level of dropped signal output from drop port of ADM module in dBm,
   Through Loss=loss associated with a signal passing through the add/drop module in dBm,
   Drop Loss=loss associated with a signal travelling a drop path of the add/drop module in dBm,
   Add Loss=loss associated with a signal travelling an add path of the add/drop module in dBm, and
   $N_{add}$=number of added channels.

20. The method according to claim 15, further comprising:
   preamplifying a signal input to the add/drop module;
   said preamplification step imparting a gain profile substantially similar to a gain profile of the add path.

21. The method according to claim 15,
   wherein the add path includes an add amplifier;
   said controlling step controlling a gain of the add amplifier.

22. The method according to claim 15, wherein the add path includes an add amplifier and a variable optical attenuator optically coupled thereto;
   said controlling step controlling a gain of the add amplifier and/or an attenuation of the variable optical attenuator.

23. The method according to claim 15, amplifying the output of the add/drop module with gain flattening amplification.

* * * * *